W. H. NICHOLS.

Lock-Nuts.

No. 135,242.             Patented Jan. 28, 1873.

UNITED STATES PATENT OFFICE.

WILLIAM H. NICHOLS, OF EAST HAMPTON, CONNECTICUT.

IMPROVEMENT IN LOCK-NUTS.

Specification forming part of Letters Patent No. 135,242, dated January 28, 1873.

*To all whom it may concern:*

Be it known that I, WILLIAM H. NICHOLS, of East Hampton, in the county of Middlesex and State of Connecticut, have invented certain new and useful Improvements in Lock-Nuts, of which the following is a specification, reference being had to the accompanying drawing, in which—

Figure 1:
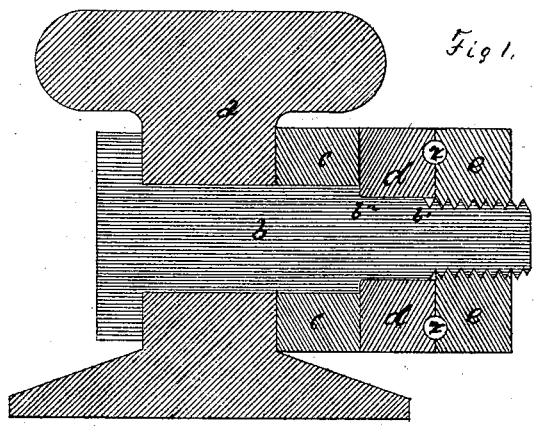
Figure 2:
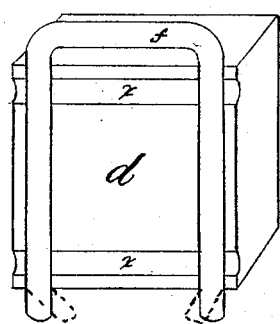

Figure 1 is a view in section of a bolt bearing my lock-nut, the bolt piercing a railway-rail and fish-plate, the section cutting the rail, fish-plate, and nut transversely, and the bolt in central vertical section. Fig. 2 is a view of the dummy nut I use, showing that face thereof which is opposed to a similar face of the real nut, with the locking-pin inserted in the grooves provided for it.

The purpose of the invention is the prevention of the loosening of a nut when screwed to a desired point on a bolt. I have, in the drawing, shown it as applied to the fish-jointing of railway rails, as this is the place where such devices find their largest use.

The letter $a$ indicates the railway rail; $b$, the bolt; and $c$, the fish-plate. The bolt is cylindrical from the point to $b^1$, and from there to $b^2$ it is square; from $b^2$ to the head of the bolt it may well be round. On the bolt, next the fish-plate, is the dummy nut $d$, having a square hole through its center fitting upon the square part of the bolt. Against this dummy nut screws the real nut $e$. The opposed faces of these two nuts have grooves $x$, one or more in number, and preferably semicircular in cross-section, so that when the grooves of the two nuts correspond in position, two round holes extend through the nuts from either edge. The dummy nut is held from turning because its square hole fits upon the square part of the bolt, and the real nut is locked in position by making the grooves of the two nuts to coincide in position, and then running a pin through one or two of the holes made by the coincident grooves. I prefer this pin to be a double one, as indicated by the letter $f$, and then the ends can readily be bent inward, as indicated by dotted lines in Fig. 2, so that the pin can not come out except by design.

I am aware that a nut has heretofore been held from turning upon a bolt by means of a groove or grooves made in the under side of the nut fitting to corresponding grooves made in a fish-plate or other similar article, into which groove or grooves a pin or pins are driven; and also that a nut has been similarly held to a washer resting upon a surface of wood, the pressure of the washer into the wood holding the washer from turning. I am also aware that a washer has been held from turning upon the bolt by means of the bolt running through a square or many-sided orifice in the washer, the nut being held from turning upon the washer by means of grooves in the side of the washer next the nut, into which pins are driven and their ends bent down upon the nut.

Neither of these things do I claim; but the essential feature of my invention is the holding of the dummy nut or washer from turning upon the bolt by means of the shape of the orifice in the washer through which the bolt runs, and in holding the nut from turning upon the washer or dummy by means of corresponding grooves in the opposed faces of both the nut and washer, into which pins are driven, the ends of which do not need to be turned down.

I claim as my invention—

The dummy nut or washer held from turning upon the bolt by means of the shape of the orifice in the washer through which the bolt runs, and the real nut held from turning upon the washer by means of a pin or pins driven into a corresponding groove or grooves in the opposed faces of the nut and washer, the whole combined, constructed, and arranged to operate substantially as described, for the purpose set forth.

WILLIAM H. NICHOLS.

Witnesses:
E. E. MARKHAM,
A. R. SMITH.